(12) United States Patent
Furukubo et al.

(10) Patent No.: US 8,677,596 B2
(45) Date of Patent: Mar. 25, 2014

(54) SWAGING HOLD METHOD, SWAGING HOLD STRUCTURE, SWAGING ROLLER, SWAGING MACHINE, AND SWAGING HOLD WORKPIECE

(75) Inventors: Taro Furukubo, Nagoya (JP); Takeshi Ishida, Nagakute-cho (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 1198 days.

(21) Appl. No.: 12/557,784

(22) Filed: Sep. 11, 2009

(65) Prior Publication Data
US 2010/0071641 A1   Mar. 25, 2010

(30) Foreign Application Priority Data

Sep. 25, 2008   (JP) .................................. 2008-246291

(51) Int. Cl.
*B21D 39/00*   (2006.01)

(52) U.S. Cl.
USPC ............................................. 29/511; 29/520

(58) Field of Classification Search
USPC ............ 29/511, 898.046, 509, 510, 516, 520, 29/898; 384/192
See application file for complete search history.

(56) References Cited

U.S. PATENT DOCUMENTS

| | | | |
|---|---|---|---|
| 5,813,789 A * | 9/1998 | Prickler et al. ................. | 403/135 |
| 7,040,812 B2 * | 5/2006 | Boshier et al. ................. | 384/192 |
| 8,122,577 B2 * | 2/2012 | Ogino ........................... | 29/33 R |
| 2008/0118197 A1 * | 5/2008 | Matsui et al. .................. | 384/494 |

FOREIGN PATENT DOCUMENTS

| | | |
|---|---|---|
| CN | 1473719 A | 2/2004 |
| CN | 1564916 A | 1/2005 |
| JP | 47-012561 | 4/1972 |
| JP | 05-076961 A | 3/1993 |
| JP | 2000-006610 A | 1/2000 |
| JP | 2000-343155 A | 12/2000 |
| JP | 2001-050291 A | 2/2001 |
| JP | 2002-021867 A | 1/2002 |
| JP | 2004-290995 A | 10/2004 |
| JP | 2007-177912 A | 7/2007 |
| JP | 2007-303408 A | 11/2007 |
| JP | 2007-303479 A | 11/2007 |
| JP | 2008-202777 A | 9/2008 |

OTHER PUBLICATIONS

Chinese Office Action for Chinese Patent Application No. 2009101742351; mailed Jan. 27, 2011; with translation.
Japanese Office Action for corresponding Japanese Patent Application No. JP 2008-246291 issued on May 25, 2010.
Japanese Office Action issued Nov. 20, 2012 for counterpart Japanese Patent Application No. 2010-166727.

* cited by examiner

*Primary Examiner* — David Bryant
*Assistant Examiner* — Ryan J Walters
(74) *Attorney, Agent, or Firm* — Sughrue Mion, PLLC (57) ABSTRACT

In addition to the pressure for swaging applied when swaging is performed, a pressure in the direction the same as the direction of the holding force exerted by a swaged portion is applied to a pressure receiving edge portion of a bearing holder by the pressure applied by a swaging roller. As a result, the elastic deformation in a circumferential wall portion that is not bent is advanced and the amount of elastic deformation of the bearing holder in the axial direction is reduced, so that it is possible to increase the difference in the amount of elastic deformation between the bearing holder and an outer race. Thus, the axial residual stress in the bearing holder is increased after the swaging is completed, as compared to the case of the ordinary swaging. Accordingly, it is possible to increase the holding force for holding the outer race.

5 Claims, 7 Drawing Sheets

SWAGING HOLD METHOD, SWAGING HOLD STRUCTURE, SWAGING ROLLER, SWAGING MACHINE, AND SWAGING HOLD WORKPIECE

INCORPORATION BY REFERENCE

The disclosure of Japanese Patent Application No. 2008-246291 filed on Sep. 25, 2008 including the specification, drawings and abstract is incorporated herein by reference in its entirety.

BACKGROUND OF THE INVENTION

1. Field of the Invention

The invention relates to a swaging hold method, a swaging hold structure, a swaging roller, a swaging machine, and a swaging hold work, which are used to form a swaged portion by bending an end portion of a workpiece by swaging to hold a held member along a base portion of the workpiece by a holding force exerted by the swaged portion.

2. Description of the Related Art

A rotation/linear motion converting actuator is available, of which the subject apparatus to be driven is an internal combustion engine, for example, and that is installed on the apparatus to provide a linear driving force to the subject apparatus (see Japanese Patent Application Publication No. 2007-303408 (JP-A-2007-303408), Japanese Patent Application Publication No. 2007-303479 (JP-A-2007-303479)). JP-A-2007-303408 and JP-A-2007-303479 describe the rotation/linear motion converting actuator that drives the valve lift mechanism for an internal combustion engine. A rotary shaft is rotatably supported, via a bearing, in a body case of the rotation/linear motion converting actuator. The rotary shaft is driven to rotate by a motor, which causes a screw shaft to linearly move in the axial direction, thereby driving the valve lift mechanism.

In JP-A-2007-303408 and JP-A-2007-303479, in order to fix the bearing for rotatably supporting the rotary shaft in a housing, an annular supporting member is disposed in the housing and the supporting member is fastened to the inner surface of the housing with bolts.

Due to the construction in which the annular supporting member to fix the bearing is disposed in the housing and fastened with bolts in this way, the size of the housing tends to become large. It is conceivable to use a swaging process (see Japanese Patent Application Publication No. 2001-50291 (JP-A-2001-50291), Japanese Patent Application Publication No. 2000-6610 (JP-A-2000-6610), and Japanese Patent Application Publication No. 2002-21867 (JP-A-2002-21867)) in combination to support the bearing.

However, when a held member, such as a bearing, that requires a certain level of holding force is held by the housing, if the held member is held by merely swaging the housing, there is a fear that the holding force for holding the held member is insufficient. Specifically, when it is tried to strengthen the holding force exerted by the swaged portion of the housing by increasing the pressure applied when the swaging is performed, most of the amount of increase in pressure contributes to the increase in the plastic deformation in the radial direction that is orthogonal to the axial direction at the swaged portion. Thus, there has been a problem that it is impossible to sufficiently increase the axial residual stress in the housing that should produce the holding force finally.

SUMMARY OF THE INVENTION

The invention makes it possible to strengthen the holding force for holding a held member by increasing the axial residual stress in a base portion of a workpiece that has been swaged.

A first aspect of the invention is a swaging hold method of swaging for holding a held member, including forming a swaged portion by bending an end portion of a workpiece by swaging to hold the held member along a base portion of the workpiece by a holding force exerted by the swaged portion, wherein a pressure applying step of applying a pressure to the base portion of the workpiece in the direction the same as the direction of the holding force is performed when the swaging is performed.

The forming is not performed simply by bending the end portion of the workpiece by the swaging. The pressure applying step is performed when the swaging is performed. In the pressure applying step, a pressure is applied to the base portion in the direction the same as the direction of the holding force for holding the held member.

In the swaging, when the swaged portion is formed, a plastic deformation of the base portion of the workpiece that is not bent, along with an elastic deformation thereof, is caused by the pressure applied when the swaging is performed. Thus, a difference in the amount of elastic deformation is caused between the base portion and the held member, which causes an axial residual stress.

In the invention, the pressure applying step is additionally performed when the swaging is performed. Thus, a pressure is applied to the base portion of the workpiece in the direction the same as the direction of the holding force, in addition to the pressure for the swaging, which results in the increase in the amount of plastic deformation in the base portion of the workpiece. Because the amount of elastic deformation is reduced in accordance with the increase in the amount of plastic deformation, the difference in the amount of elastic deformation between the base portion and the held member is increased as compared to the case where the swaging only is performed. As a result, the axial residual stress is increased.

Thus, it is possible to increase the axial residual stress in the base portion of the workpiece that has been swaged and it is therefore possible to strengthen the holding force for holding the held member. In particular, because the swaging and the pressure applying step are simultaneously performed, the pressure applying step is performed when the position of the end portion of the workpiece is fixed by the swaging pressure applied when the swaging is performed. Thus, it becomes unnecessary to fix the workpiece to perform the pressure applying step and the operation is simplified.

A second aspect of the invention is a swaging hold method of swaging for holding a held member, including: forming a swaged portion by bending an end portion of a workpiece by swaging to hold the held member along a base portion of the workpiece by a holding force exerted by the swaged portion; and after the swaging is performed, performing a pressure applying step of applying a pressure that causes a plastic deformation to the base portion of the workpiece in the direction the same as the direction of the holding force.

The forming is not performed simply by bending the end portion of the workpiece by the swaging. The pressure applying step is performed after the swaging is performed. In the pressure applying step, a pressure that causes a plastic deformation of the base portion of the workpiece is applied to the base portion in the direction the same as the direction of the holding force.

In the swaging, when the swaged portion is formed, a plastic deformation of the base portion of the workpiece that is not bent, along with an elastic deformation thereof, is caused by the pressure applied when the swaging is performed. Thus, a difference in the amount of elastic deformation is caused between the base portion and the held member, which causes an axial residual stress.

In the invention, the pressure applying step is additionally performed after the swaging is performed. Thus, a pressure is applied to the base portion of the workpiece in the direction the same as the direction of the holding force, which results in the increase in the amount of plastic deformation in the base portion of the workpiece after the swaging is performed. It is possible to reduce the amount of elastic deformation remaining after the swaging is performed, according to the amount of increase in plastic deformation. Thus, the difference in the amount of elastic deformation between the base portion and the held member is increased as compared to the case where the swaging only is performed. As a result, the axial residual stress is increased.

Thus, it is possible to increase the axial residual stress in the base portion of the workpiece that has been swaged and it is therefore possible to strengthen the holding force for holding the held member. In the swaging hold method according to the first and second aspects, an edge portion that protrudes on a side opposite to a side to which the end portion is bent may be formed in the base portion of the workpiece in a region of the base portion adjacent to the swaged portion, and the pressure may be applied to the edge portion in the pressure applying step.

When the edge portion is formed in this way, it is possible to easily apply a pressure to the base portion of the workpiece. In the swaging hold method according to the first and second aspects, the workpiece may be cylindrical, the edge portion may be formed on the outer circumference side of the workpiece, and in the swaging, the swaged portion may be formed by bending the end portion of the workpiece toward the inner circumference side of the workpiece.

When the positional relationship between the edge portion and the swaged portion is set in this way, it is possible to easily apply the pressure to the base portion of the workpiece. In the swaging hold method according to the first aspect, the swaging and the pressure applying step may be simultaneously performed using a swaging roller that has a swaging surface and a pressure applying surface formed on the outer circumferential surface of the swaging roller.

When the swaging that uses the swaging surface and the pressure applying step that uses the pressure applying surface are simultaneously performed using the swaging roller that has the swaging surface and the pressure applying surface formed on the outer circumferential surface, it is possible to easily and swiftly complete the swaging for holding the held member.

In the swaging hold method according to the first and second aspects, the held member may be a bearing; and the workpiece may be a housing that houses therein a rotary member rotatably disposed via the bearing, or may be a bearing holder that is disposed in the housing.

The invention can be used for holding a bearing in the housing or the bearing holder in this way, and it is possible to increase the difference in the amount of elastic deformation between the bearing and the housing or the bearing holder in the axial direction as compared to the conventional case. Thus, the axial residual stress in the housing or the bearing holder is increased as compared to the case of the conventional swaging, so that it is possible to perform swaging for holding with the increased holding force for holding the bearing.

Because it becomes possible to perform the swaging for holding such that the holding force is increased without additionally provide a mechanism for fixing the bearing in the housing or the bearing holder with bolts or the like. Thus, it is possible to reduce the overall size of the housing or the bearing holder.

In the swaging hold method according to the first and second aspects, the bearing, and the housing or the bearing holder may be a bearing, and a housing or a bearing holder of a rotation/linear motion converting actuator, and the rotation/linear motion converting actuator may be such that the rotary member is rotatably disposed via the bearing in the housing or the bearing holder that is attached to a driven apparatus, an output shaft that is moved in the axial direction of the workpiece by rotation of the rotary member is disposed in a state where the output shaft projects from the housing to the outside, and a driving force is transmitted from the output shaft to the driven apparatus through the output shaft.

The invention can be applied to the manufacturing of such a rotation/linear motion converting actuator. In this case, it is possible to produce a large axial residual stress in the housing or the bearing holder, so that it is possible to obtain a sufficient strength of bearing holding force by swaging. Thus, it is possible to reduce the size of the rotation/linear motion converting actuator, which also contributes to the downsizing of the overall driven apparatus.

In the swaging hold method according to the first and second aspects, the rotary member may be a nut of a planetary differential screw-based rotation/linear motion converting mechanism, the output shaft may be a sun shaft, a planetary shaft may be disposed between the nut and the sun shaft, and rotation/linear motion conversion may as a result be performed by a mechanism formed in the nut by meshing the sun shaft, the planetary shaft, and the nut.

The rotation/linear motion converting actuator may be such a planetary differential screw-based rotation/linear motion converting mechanism, and the similar operation and effects are brought about. In the swaging hold method according to the first and second aspects, the driven apparatus may be an internal combustion engine.

With this configuration, it is possible to reduce the size of the overall internal combustion engine. A swaging hold structure according to a third aspect of the invention is characterized in that the held member is held in the workpiece by performing the swaging and the pressure applying step of the swaging hold method according to the first or second aspect.

In the swaging hold structure in which the held member is held by performing the swaging hold method according to the first or second aspect, the difference in the amount of elastic deformation in the holding direction between the held member and the workpiece that holds the held member is increased as described above. Thus, the axial residual stress in the base portion of the workpiece is increased. Accordingly, the swaging hold structure of the invention increases the holding force for holding the held member.

A swaging roller according to a fourth aspect of the invention is a swaging roller that forms a swaged portion by bending an end portion of a cylindrical workpiece by swaging to hold a held member along a base portion of the workpiece by a holding force exerted by the swaged portion, the swaging roller characterized by including: a swaging surface that forms the swaged portion by bending the end portion of the workpiece; and a pressure applying surface that applies a pressure to the base portion of the workpiece in the direction the same as the direction of the holding force.

When swaging is performed using this swaging roller, it is possible to perform the swaging and at the same time the pressure applying step of applying a pressure to the base portion of the workpiece in the direction the same as the direction of the holding force. Thus, the swaging hold structure formed in the workpiece by the swaging using this swaging roller increases the holding force for holding the held member as described above.

A swaging machine according to a fifth aspect of the invention includes the swaging roller according to the fourth aspect, and the end portion of the workpiece is pressed and bent by the swaging surface in the direction orthogonal to the axis of the swaging roller to form the swaged portion and at the same time, a pressure is applied to the base portion of the workpiece in the direction the same as the direction of the holding force by the pressure applying surface.

The swaging hold structure that is formed in the workpiece by performing the swaging using such a swaging machine increases the holding force for holding the held member as described above. A swaging hold workpiece according to a sixth aspect of the invention is a swaging hold workpiece such that an end portion of the swaging hold workpiece is bent by swaging to form a swaged portion to hold a held member along a base portion of the workpiece by a holding force exerted by the swaged portion, the swaging hold workpiece characterized in that a pressure receiving edge portion that protrudes on the side opposite to the side to which the end portion is bent is formed in the base portion of the workpiece in a region of the base portion adjacent to the swaged portion.

When the swaging hold workpiece in which the pressure receiving edge portion is formed is used, it becomes easy to apply a pressure to the pressure receiving edge portion simultaneously with the swaging of the end portion. Thus, it is possible to easily form the swaging hold structure that increases the holding force for holding the held member.

In the swaging hold workpiece according to the sixth aspect of the invention, the held member may be a bearing, and the swaging hold workpiece may be a housing in which a rotary member rotatably disposed via the bearing is housed, or may be a bearing holder disposed in the housing.

As described above, the invention can be applied to the swaging hold workpiece, which is a housing or a bearing holder, in which a bearing is held in the housing or the bearing holder by the swaging. Thus, it is possible to increase the difference in the amount of elastic deformation between the bearing and the housing or the bearing holder in the holding force direction as compared to the conventional case. Thus, the axial residual stress in the housing or the bearing holder is increased as compared to the case of the conventional swaging, so that it is possible to increase the holding force for holding the bearing.

Because there is no need to additionally provide a mechanism for fixing the bearing in the housing or the bearing holder with bolts or the like to increase the holding force, it is possible to reduce the overall size of the housing or the bearing holder.

In the swaging hold workpiece according to the sixth aspect of the invention, the bearing, and the housing or the bearing holder may be a bearing, and a housing or a bearing holder of a rotation/linear motion converting actuator, and the rotation/linear motion converting actuator may be such that the rotary member is rotatably disposed via the bearing in the bearing holder or the housing that is attached to a driven apparatus, an output shaft that is moved in the axial direction of the workpiece by rotation of the rotary member is disposed in a state where the output shaft projects from the housing to the outside, and a driving force is transmitted from the output shaft to the driven apparatus.

The invention can be applied to such a rotation/linear motion converting actuator. In this case, it is possible to produce a large axial residual stress in the housing or the bearing holder, so that it is possible to achieve reliable holding of the bearing. Thus, it is possible to reduce the size of the rotation/linear motion converting actuator, which also contributes to the downsizing of the overall driven apparatus.

In the swaging hold workpiece according to the sixth aspect of the invention, the rotary member may be a nut of a planetary differential screw-based rotation/linear motion converting mechanism, the output shaft may be a sun shaft, a planetary shaft may be disposed between the nut and the sun shaft, and rotation/linear motion conversion may as a result be performed by a mechanism formed in the nut by meshing the sun shaft, the planetary shaft, and the nut.

The rotation/linear motion converting actuator may be such a planetary differential screw-based rotation/linear motion converting mechanism. Also in this case, it is possible to produce a large axial residual stress in the housing or the bearing holder, so that it is possible to achieve reliable holding of the bearing. Thus, it is possible to reduce the size of the rotation/linear motion converting actuator, which also contributes to the downsizing of the overall driven apparatus.

With regard to the swaging hold workpiece according to sixth aspect, the driven apparatus may be an internal combustion engine. In this case, it is possible to reduce the size of the overall internal combustion engine.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
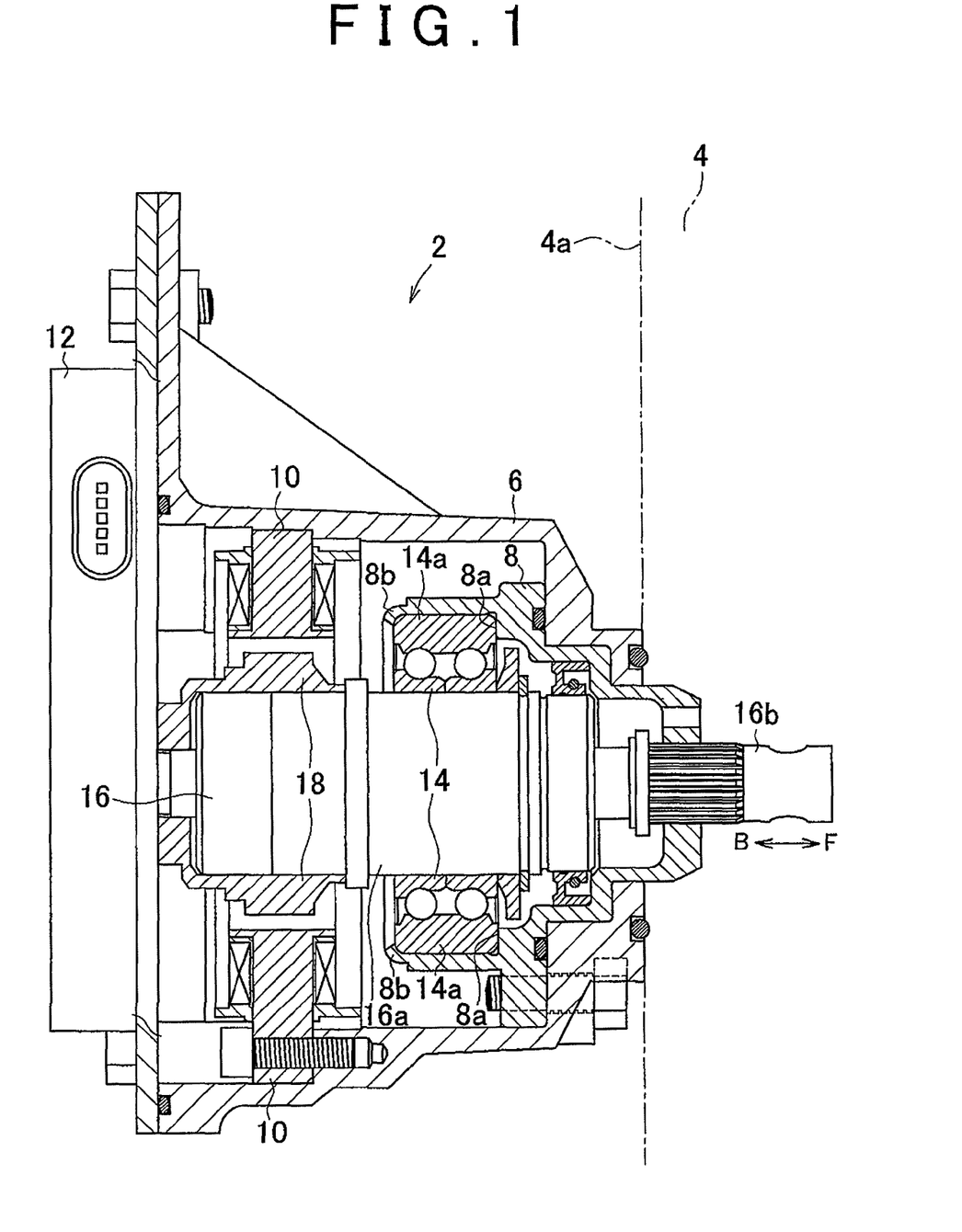
FIG. 1 is a longitudinal section view of a rotation/linear motion converting actuator of a first embodiment.

The longitudinal section view shown in FIG. 1 shows a configuration of a rotation/linear motion converting actuator (hereinafter referred to as "the actuator") 2 to which the invention is applied. The apparatus to be driven by the actuator 2 is an internal combustion engine and the actuator 2 is installed on an outer surface of a cam carrier or a cylinder head of the internal combustion engine. Specifically, in order to drive a variable valve mechanism on the cylinder head, the actuator 2 axially drives a control shaft provided in the variable valve mechanism. In this case, the actuator 2 is installed on an outer circumferential surface 4a of a cam carrier 4 as shown by the chain line.

In a housing 6 of the actuator 2, a bearing holder 8 is fastened with bolts in the front side (F side in FIG. 1), and a stator 10 is fastened with bolts in the back side (B side in FIG. 1). The back end of the housing 6 is closed by a control panel 12.

In the back side of the bearing holder 8, a bearing 14 is installed. The bearing holder 8 rotatably supports, via the bearing 14, a nut 16a that forms the outer circumference of a planetary differential screw-based rotation/linear motion converting mechanism 16.

Figure 2:
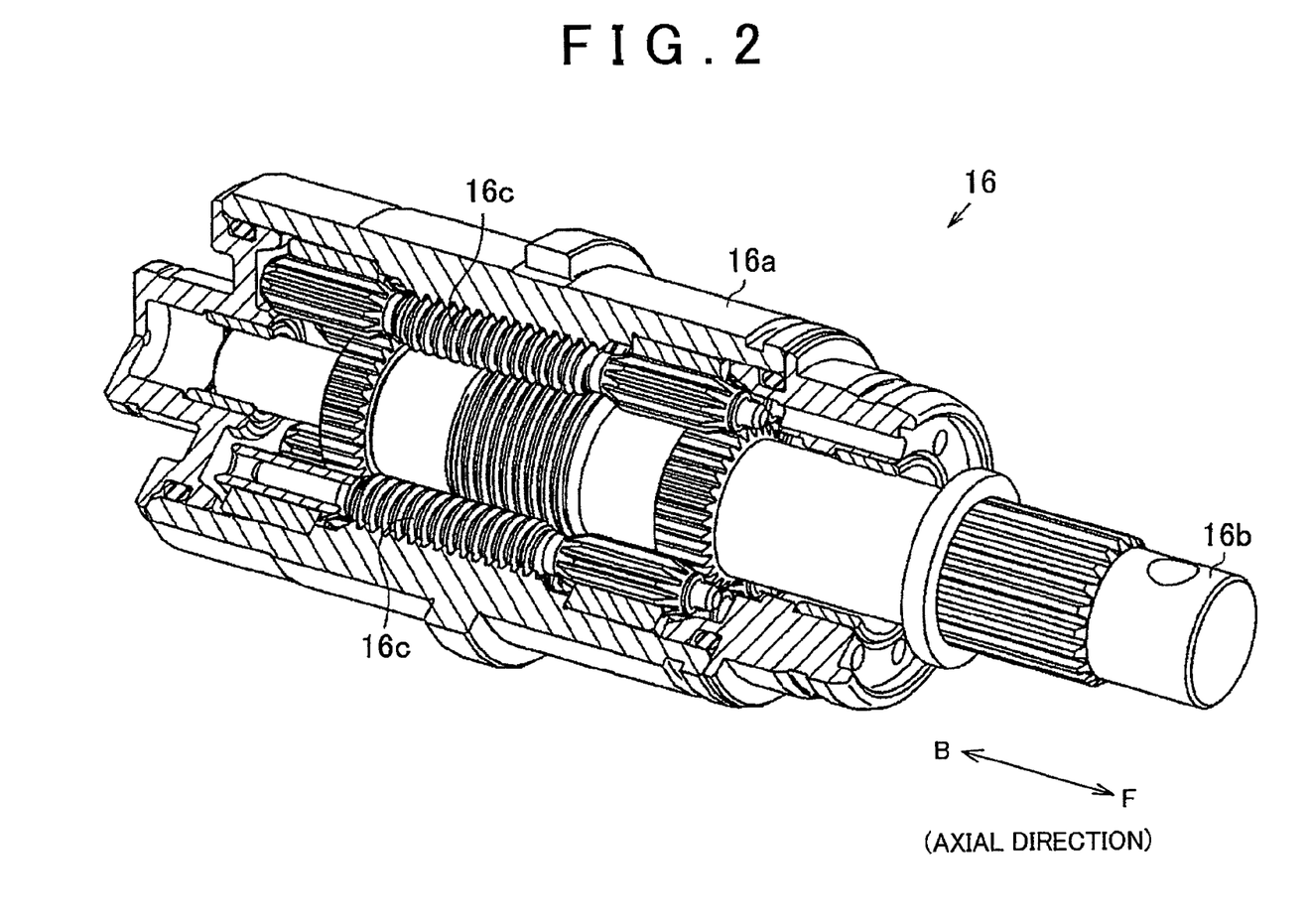
FIG. 2 is a partially cutaway perspective view of a planetary differential screw-based rotation/linear motion converting mechanism used as the rotation/linear motion converting actuator.

The planetary differential screw-based rotation/linear motion converting mechanism 16 is disposed in the housing 6 so as to extend through the internal space in the housing 6. As shown in FIG. 2, which is a partially cutaway perspective view, the planetary differential screw-based rotation/linear motion converting mechanism 16 includes: the nut 16a, which is a rotary member; an output shaft 16b, which is a sun shaft; and planetary shafts 16c, which are disposed between the nut 16a and the output shaft 16b. The nut 16a and the planetary shafts 16c mesh with each other via gears and screws, and the planetary shafts 16c and the output shaft 16b also mesh with each other via gears and screws.

As shown in FIG. 1, a rotor 18 is press-fitted onto the back end portion of the nut 16a and the rotor 18 is driven to rotate by the above described stator 10 in accordance with the drive signal from the control panel 12, whereby the nut 16a is rotated about the axis. The rotation of the nut 16a causes the planetary shafts 16c to rotate about the respective axes and at the same time revolve around the output shaft 16b. The output shaft 16b that is spline-fitted into a tip portion of the bearing holder 8 and is thus prevented from rotating about the axis, is axially moved by the differential operation of the screws caused by the rotation and revolution of the planetary shafts 16c. The control shaft of the variable valve mechanism that is in the space in the cam carrier 4 is axially moved with the axial movement of the output shaft 16b, whereby the maximum valve lift of intake valve(s) of each cylinder of the internal combustion engine is continuously adjusted.

With regard to the bearing 14 that supports the entire planetary differential screw-based rotation/linear motion converting mechanism 16, an outer race 14a thereof (serving as the held member) is axially supported by a contact surface 8a provided in the bearing holder 8 in the form of a step and by a swaged portion 8b at the back end portion. Thus, the entire planetary differential screw-based rotation/linear motion converting mechanism 16 is held at a reference position in the housing 6 by the bearing holder 8.

Figure 3:
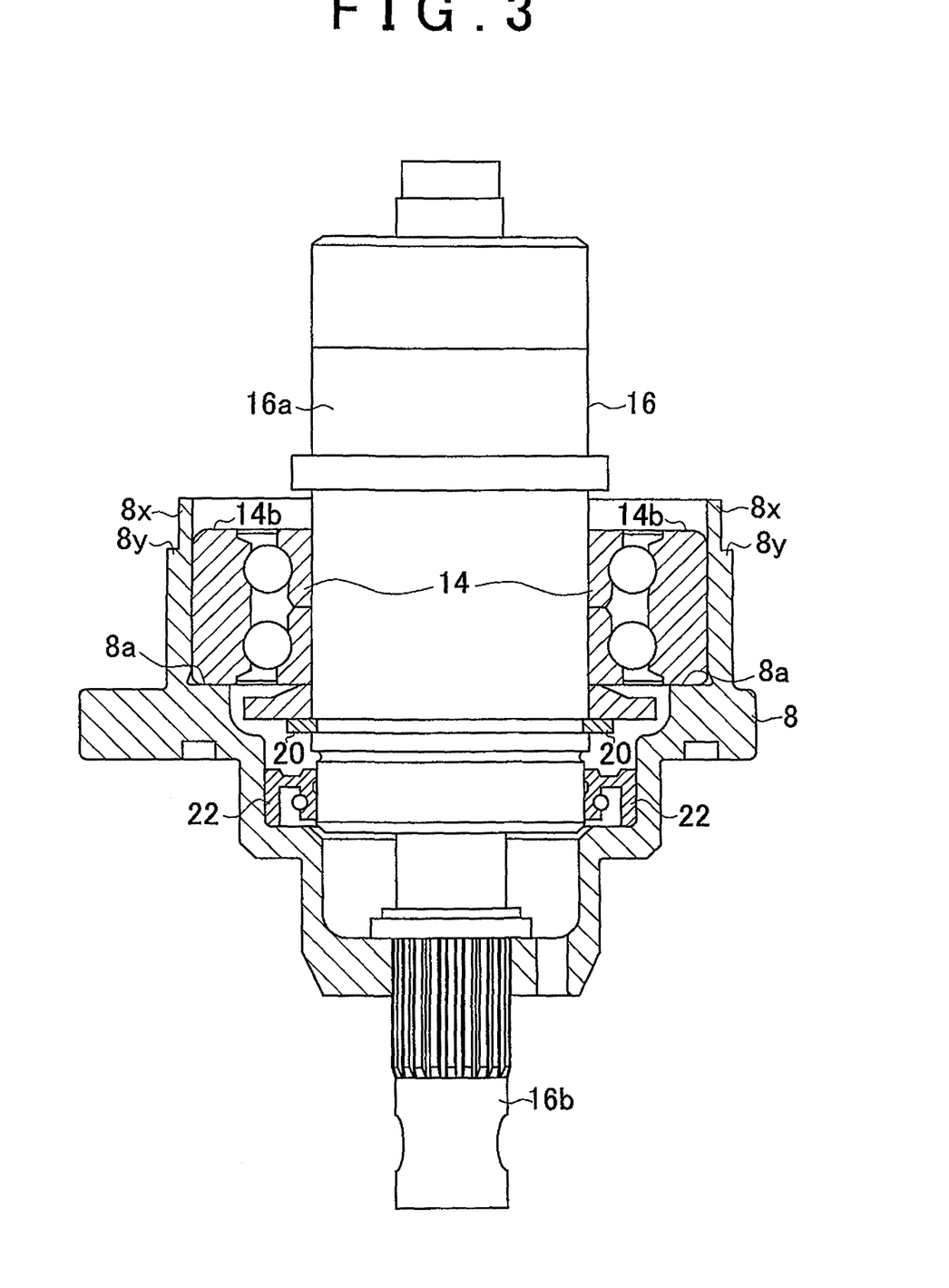
FIG. 3 is a longitudinal section view showing an assembly state immediately before swaging is performed, in the case of the first embodiment.

Swaging for forming the swaged portion 8b will be described. The sectional view in FIG. 3 shows an assembly state immediately before the swaging is performed. Before the swaging is performed, the back end of the bearing holder 8 (serving as the workpiece) is an unprocessed portion 8x, which has a standing, cylindrical shape. Thus, the back end is open and the planetary differential screw-based rotation/linear motion converting mechanism 16 is inserted into the bearing holder 8 from the back end side. Before the insertion, the planetary differential screw-based rotation/linear motion converting mechanism 16 is brought into a state in which the bearing 14 is fitted onto the outer circumference of the nut 16a and fixed by a snap ring 20. In addition, a seal ring 22 is also inserted into the bearing holder 8 from the back end side and disposed at a predetermined position in advance. Note that the seal ring 22 may be fitted onto the planetary differential screw-based rotation/linear motion converting mechanism 16 in advance to place the seal ring 22 simultaneously with the insertion of the planetary differential screw-based rotation/linear motion converting mechanism 16.

Figure 4:
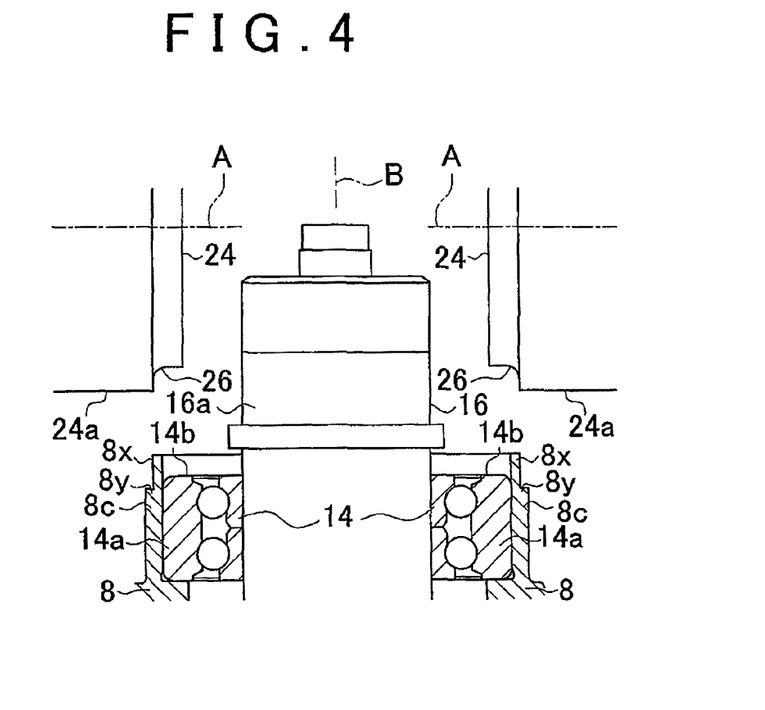
FIG. 4 is an explanatory diagram showing a state of arrangement of swaging rollers and a bearing holder of the first embodiment.

The assembly shown in FIG. 3 is set in a roll swaging machine. Then, as shown in FIG. 4, swaging of the unprocessed portion 8x is performed with the use of swaging rollers 24, 24. The swaging rollers 24, 24 are arranged at 180-degree phase intervals around the axis B of the bearing holder 8 and each of the swaging rollers 24, 24 is rotated about the rotation axis A. Note that in FIG. 4, the rotation axes A of the swaging rollers 24, 24 and the axis B of the bearing holder 8 are shown in a state where these axes are in parallel with the drawing sheet. Further, the rotation axis A and the axis B are orthogonal with each other.

Figure 5:
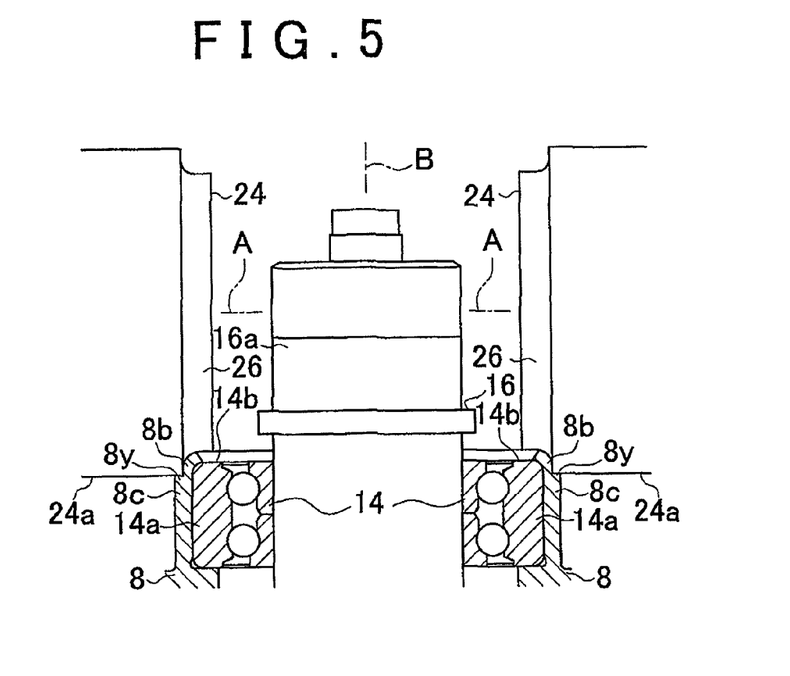
FIG. 5 is an explanatory diagram showing a state of swaging according to the first embodiment.

Each of the rollers 24, 24 is rotated about the rotation axis A and at the same time revolved around the axis B of the bearing holder 8, while a swaging surface 26 formed on each of the rollers 24, 24 is pressed against the unprocessed portion 8x. Thus, the unprocessed portion 8x is pressed by the swaging surfaces 26, 26. By pressing in this way, the unprocessed portion 8x is bent inward with respect to the bearing holder 8 so as to fit an end surface 14b of the outer race 14a, whereby the swaged portion 8b is formed as shown in FIG. 5.

Simultaneously with the performance of the swaging using the swaging surfaces 26, 26, an outer circumferential surface 24a of the roller 24 that is adjacent to the swaging surface 26 functions as the pressure applying surface, which contacts a pressure receiving edge portion 8y provided adjacent to the unprocessed portion 8x on the outer side with respect to the bearing holder 8 and applies a pressure (that is, a pressing force) to the pressure receiving edge portion 8y.

The pressure applied during the swaging by the swaging surface 26 from the unprocessed portion 8x side is applied to a circumferential wall portion 8c (serving as the base portion of the bearing holder 8) that is not the subject to be bent, in the direction parallel with the axis B (holding force direction) during the swaging. In addition, the outer circumferential surface 24a of each of the rollers 24, 24 also presses the pressure receiving edge portion 8y as described above, so that a pressing force is also applied from the pressure receiving edge portion 8y to the circumferential wall portion 8c.

In the circumferential wall portion 8c, elastic deformation and plastic deformation are caused by the deformation during the swaging of the unprocessed portion 8x. With regard to the proportion, due to the pressure applied from the pressure receiving edge portion 8y, the amount of plastic deformation increases and the amount of elastic deformation correspondingly decreases. Note that the outer race 14a of the bearing 14, which receives the pressure from the end surface 14b through the unprocessed portion 8x (the swaged portion 8b after the swaging) during the swaging, is made of a hard material and is therefore deformed elastically only. For example, although the bearing holder 8 and the outer race 14a are both made of steel material, the outer race 14a is made of a steel material that is harder than the steel material for the bearing holder 8. For example, the bearing holder 8 is made of a common stainless steel, and the outer race 14*a* is made of a hard steel, such as high carbon chrome steel.

The difference between the amount of elastic deformation of the outer race 14*a* of the bearing 14 and the amount of elastic deformation of the circumferential wall portion 8*c* of the bearing holder 8 causes the axial residual stress in the bearing holder 8 after the swaging is performed. Due to the axial residual stress, the outer race 14*a* receives the holding pressure from the swaged portion 8*b* in a state where the outer race 14*a* is in contact with the contact surface 8*a*, and thus, the entire bearing 14 is held in the bearing holder 8. Thus, the nut 16*a* of the planetary differential screw-based rotation/linear motion converting mechanism 16 is rotatably supported in the bearing holder 8.

Figure 6A:
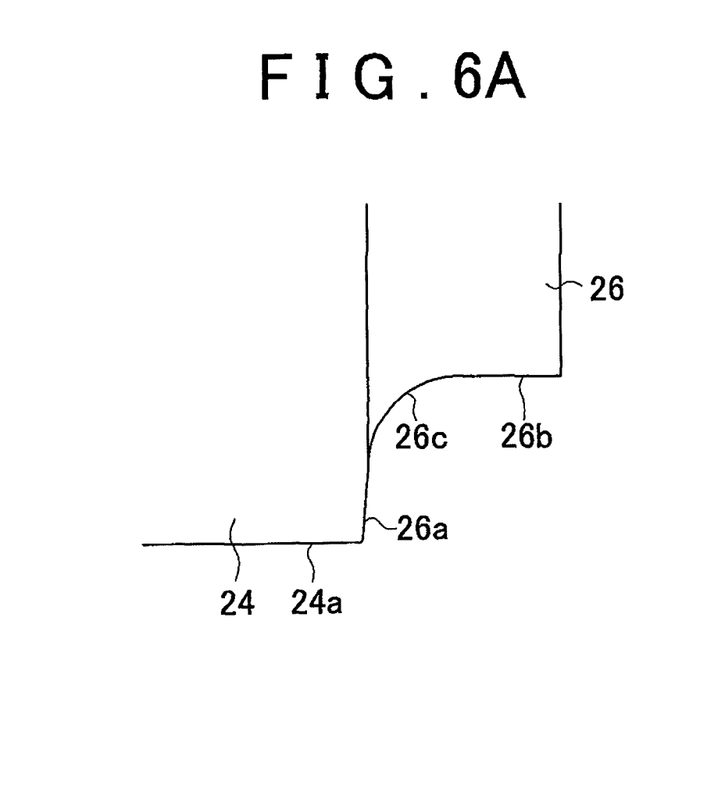
FIG. 6A is an explanatory diagram showing the swaging roller according to the first embodiment.
Figure 6B:
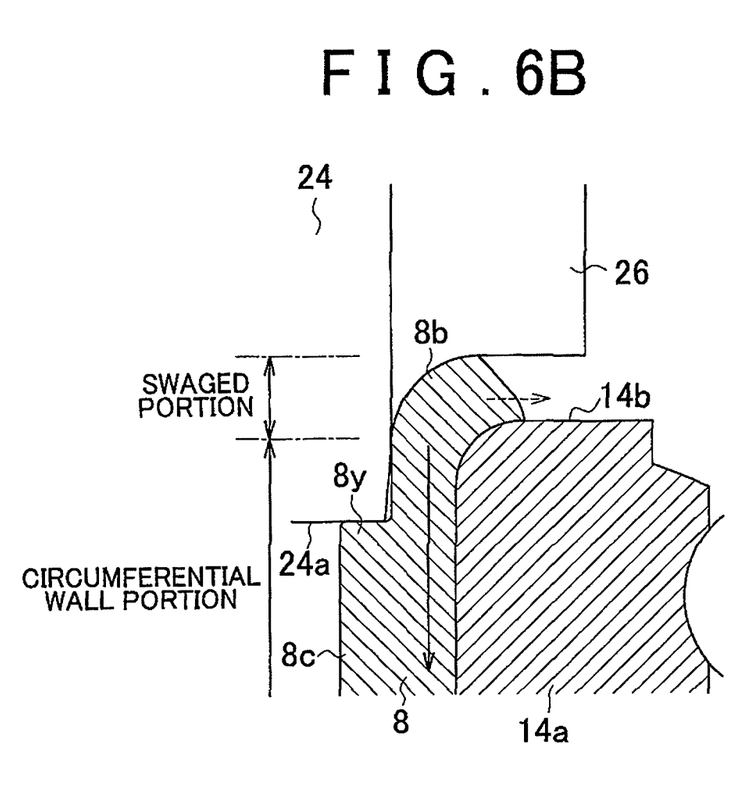
FIG. 6B is an explanatory diagram showing a state of swaging according to the first embodiment.

FIGS. 6A and 6B are partially enlarged views showing the swaging surface 26 and the adjacent, outer circumferential surface 24*a* of the roller 24. FIG. 6A is a main part enlarged view of the roller 24. FIG. 6B is a main part enlarged view when the swaging is performed. As shown in FIGS. 6A and 6B, of the portions of the swaging surface 26, a circumferential wall support surface 26*a* is a surface that prevents the circumferential wall portion 8*c* that is not bent when the swaging is performed, from warping outward. In addition, the swaging surface 26 includes: a pressing circumferential surface 26*b* that is formed cylindrically about the rotation axis A and bends the unprocessed portion 8*x* toward the end surface 14*b* of the outer race 14*a*; and a round pressing circumferential surface 26*c* that connects between the pressing circumferential surface 26*b* and the circumferential wall support surface 26*a*.

When the swaging using the pressing circumferential surface 26*b* and the round pressing circumferential surface 26*c* is performed, as shown by the broken-line arrow in FIG. 6B, plastic flow in the direction toward the tip of the swaged portion 8*b* occurs, and plastic flow in the direction toward the circumferential wall portion 8*c* also occurs. In particular, the outer circumferential surface 24*a* of each of the rollers 24, 24 presses the pressure receiving edge portion 8*y*, so that the plastic flow in the direction of the circumferential wall portion 8*c* as shown by the solid-line arrow increases.

According to the first embodiment described above, the following effects are achieved. (1) By performing the swaging of the bearing holder 8 configured as described above with the use of the swaging machine provided with the rollers 24, 24 configured as described above, a pressing force in the direction the same as the direction of the holding force generated by the swaged portion 8*b* is applied to the pressure receiving edge portion 8*y* in addition to the pressure for swaging when the swaging is performed. In this way, plastic deformation of the circumferential wall portion 8*c* of the bearing holder 8 is advanced, so that it is possible to reduce the amount of elastic deformation of the bearing holder 8 in the direction of the holding force when the swaging is performed and therefore, it is possible to increase the difference between the amount of elastic deformation of the bearing holder 8 and the amount of elastic deformation of the outer race 14*a* as compared to the case of the ordinary swaging.

After the swaging is completed, the outer race 14*a* is restored from the compressed state in which the outer race 14*a* is compressed due to the elastic deformation at the time of pressing and at the same time, the circumferential wall portion 8*c* of the bearing holder 8 also tries to recover from the compressed state. In this case, the plastic deformation is irreversible and the axial residual stress in the bearing holder 8 is increased as compared to the case of the ordinary swaging after the swaging is completed. Thus, it is possible to increase the holding force to hold the outer race 14*a*.

(2) In particular, if the pressure applying step is performed when the swaging is performed, the unprocessed portion 8*x* (swaged portion 8*b*) is sandwiched between the outer race 14*a* and both of the pressing circumferential surface 26*b* and the round pressing circumferential surface 26*c* during the pressure applying step. Thus, fixation of the bearing holder 8 to prevent the end portion of the bearing holder 8 from coming away from the outer race 14*a* outward during the pressure applying step is performed not only by the circumferential wall support surface 26*a* but also by the pressing circumferential surface 26*b* and the round pressing circumferential surface 26*c*. As a result, the fixing operation for the pressure applying step becomes unnecessary and the operation is simplified.

(3) Because both of the swaging and the pressure applying step are performed by the rollers 24, 24, it is possible to easily and swiftly complete the swaging for holding the bearing 14. (4) The pressure receiving edge portion 8*y* that protrudes on the side (outer circumference side) opposite to the side to which the swaged portion 8*b* is bent (the inner circumference side of the bearing holder 8) is formed on the circumferential wall portion 8*c*, which is the base portion of the bearing holder 8. In the pressure applying step, a pressure is applied to the pressure receiving edge portion 8*y* through the outer circumferential surface 24*a* of the roller 24, 24 when the swaging is performed. Thus, it is possible to easily apply a pressure to the circumferential wall portion 8*c* of the bearing holder 8.

(5) Because it becomes possible to perform the swaging for holding such that the holding force is increased without additionally provide a mechanism for fixing the bearing 14 in the bearing holder 8 with bolts or the like. Thus, it is possible to reduce the overall size of the bearing holder 8. As a result, it is also possible to reduce the size of the housing 6 that houses the bearing holder 8 and it is therefore possible to reduce the overall size of the actuator 2. In addition, it is possible to reduce the size of the internal combustion engine into which the actuator 2 is incorporated.

Second Embodiment

Figure 7:
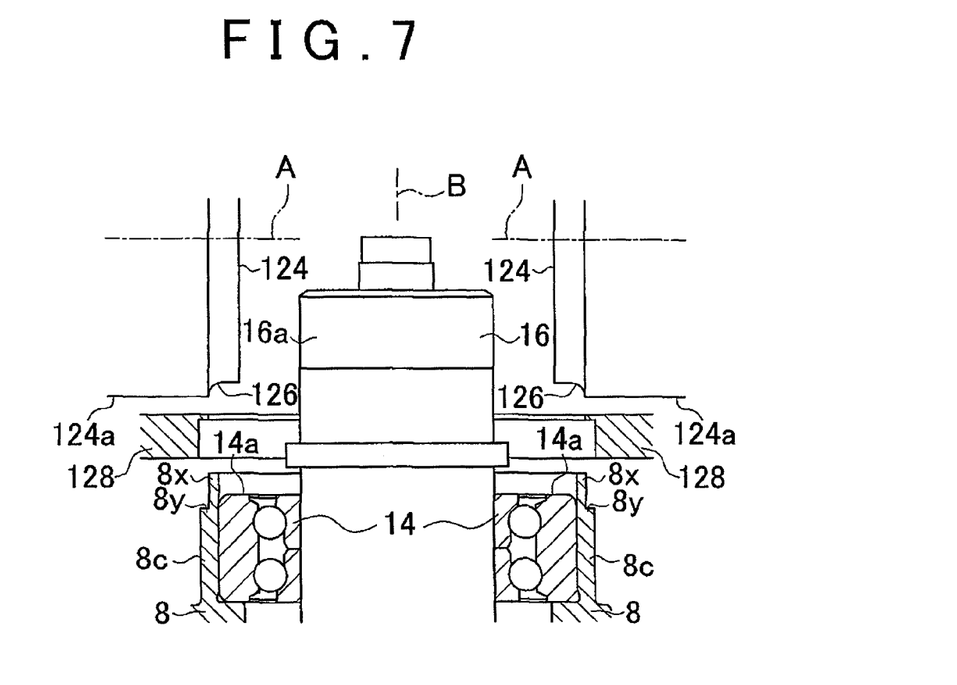
FIG. 7 is an explanatory diagram showing a state of arrangement of swaging rollers and a bearing holder of a second embodiment.

Arrangement when swaging is performed in the case of a second embodiment is shown in FIG. 7. In this embodiment, the shapes of the bearing holder 8, the bearing 14, the planetary differential screw-based rotation/linear motion converting mechanism 16 are the same as those of the first embodiment and therefore, description thereof will be made using the same reference numerals.

Figure 8:
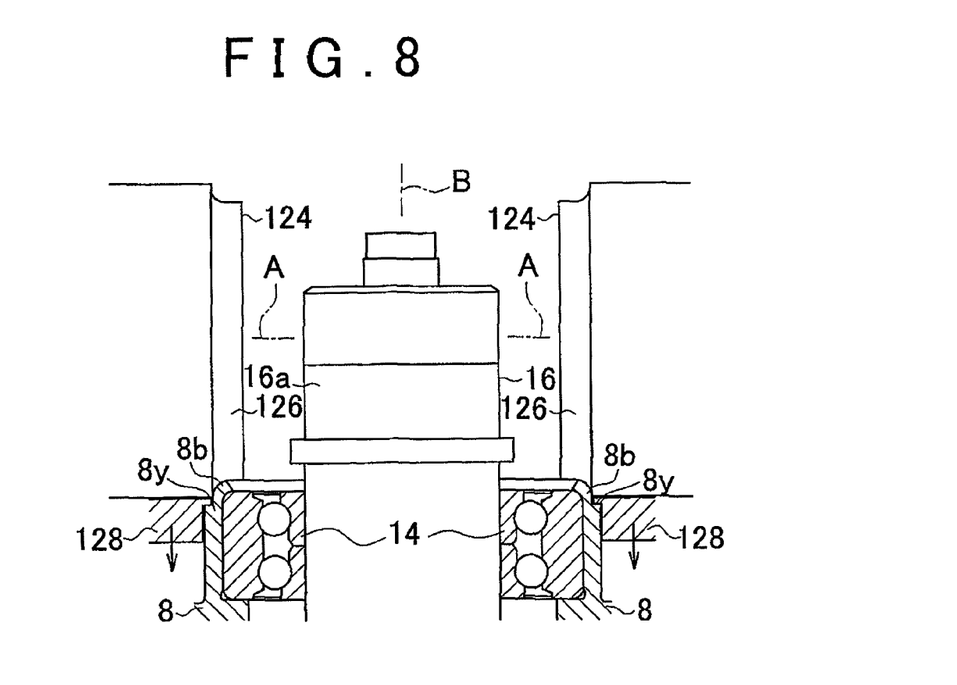
FIG. 8 is an explanatory diagram showing a state of swaging according to the second embodiment.

In this embodiment, two rollers 124, 124, which are arranged at 180-degree phase intervals, merely swage the unprocessed portion 8*x* on respective swaging surfaces 126, 126 and do not press the pressure receiving edge portion 8*y*. Instead, a ring-shaped pressing member 128 is used to apply a pressure to the pressure receiving edge portion 8*y* with the use of hydraulic pressure, spring force, etc. when the swaging is performed with the use of the rollers 124, 124 as shown in FIG. 8.

Thus, the pressure applied when the swaging is performed using the rollers 124, 124 is applied, in the direction along the axis B, from the unprocessed portion 8*x* side to the circumferential wall portion 8*c* that is not the subject to be bent when the swaging is performed. At the same time, a pressure (solid-line arrow in FIG. 8) from the ring-shaped pressing member 128 is also applied to the circumferential wall portion 8*c* through the pressure receiving edge portion 8*y*.

As in the case of the first embodiment, when the circumferential wall portion 8c is deformed when the unprocessed portion 8x is swaged, both elastic deformation and plastic deformation occur in the circumferential wall portion 8c. In the ratio between these deformations, the amount of plastic deformation increases due to the application of pressure through the pressure receiving edge portion 8y and the amount of elastic deformation is correspondingly reduced.

According to the second embodiment described above, the following effects are achieved. (1) Although there is difference between the second embodiment and the first embodiment in that the swaging pressure applied to the unprocessed portion 8x is applied by the rollers 124, 124 and the pressure to increase the amount of plastic deformation applied to the pressure receiving edge portion 8y is applied by the ring-shaped pressing member 128, the effects (1), (2), (4), and (5) of the first embodiment are also brought about also in the swaging hold method of the second embodiment.

(2) In particular, the pressure to increase the amount of plastic deformation is applied to the pressure receiving edge portion 8y by the ring-shaped pressing member 128 independently of the rollers 124, 124, so that it is possible to set the axial residual stress without significantly affecting the condition of the swaged portion 8b formed by the swaging and it is therefore possible to increase the degree of freedom in setting the axial residual stress.

Third Embodiment

Figure 9:
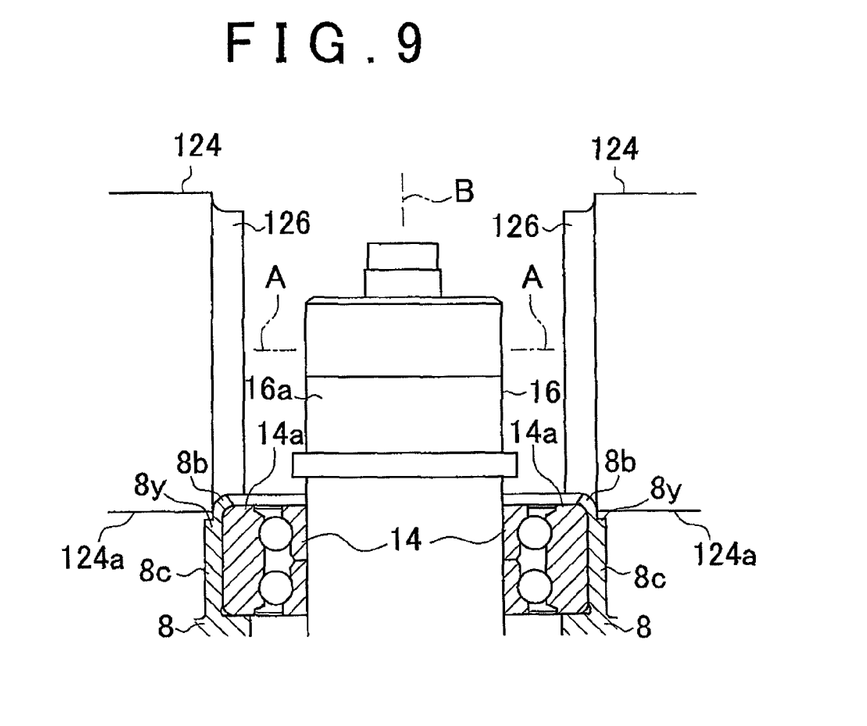
FIG. 9 is an explanatory diagram showing a state of swaging according to a third embodiment.
Figure 10:
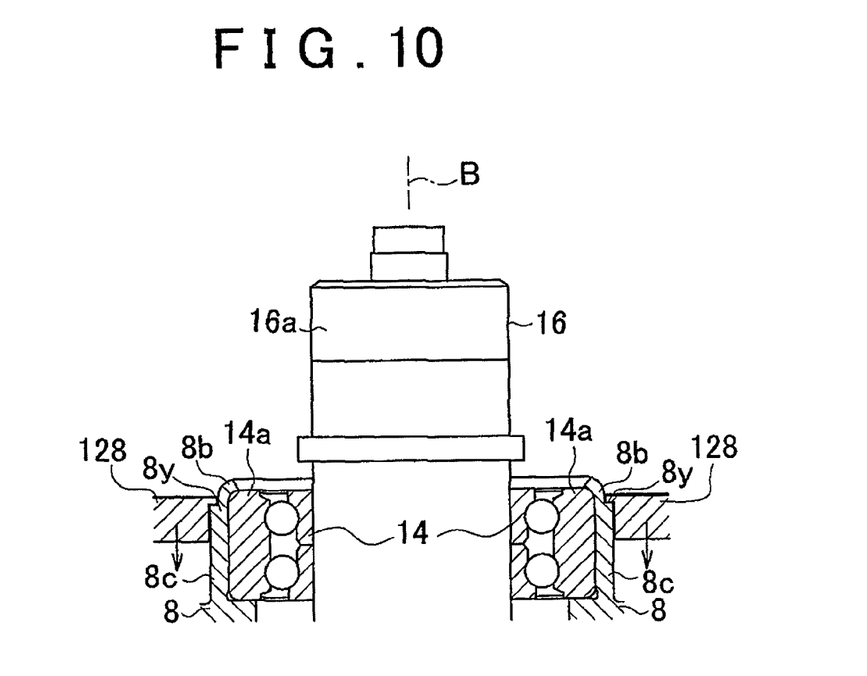
FIG. 10 is an explanatory diagram for explaining a pressure applying step according to the third embodiment.

In a third embodiment, the swaging is performed using the same components as those of the second embodiment. As shown in FIG. 9, swaging of the unprocessed portion 8x is performed using the rollers 124, 124 to form the swaged portion 8b at the edge portion of the bearing holder 8. Then, as the pressure applying step, as shown in FIG. 10, a pressure (solid-line arrow in FIG. 10) is applied to the pressure receiving edge portion 8y by the ring-shaped pressing member 128 for a short time to cause a certain amount of plastic deformation in the direction, along the axis B, the same as the direction in which the holding force is exerted by the swaged portion 8b. In this way, it is possible to increase the axial residual stress in the circumferential wall portion 8c.

According to the third embodiment described above, the following effects are achieved. (2) The effects (1), (4), and (5) of the first embodiment and the effect (2) of the second embodiment are brought about.

Other Embodiments (a) Although in the third embodiment, the pressure applying step is performed after the completion of the swaging, the swaging and the pressure applying step can be performed at any timings. Thus, for example, the whole process may be completed in such a manner that at the first step, the swaging is performed to some extent and thereafter, at the second step, the final swaging and pressure applying step are simultaneously performed.

(b) In the above embodiments, the swaging machine, in which two swaging rollers are arranged around the axis of the bearing holder at 180-degree phase intervals, is used. However, the number of the swaging rollers may be one. Alternatively, a swaging machine in which three swaging rollers are arranged at 120-degree phase intervals or a swaging machine in which four swaging rollers are arranged at 90-degree phase intervals may be used.

(c) In the above embodiments, the outer race of the bearing is held by the bearing holder. However, a construction may be adopted in which without using the bearing holder, the swaged portion is formed directly on a housing by the swaging to directly hold the outer race of the bearing by the housing. Also in this case, when the pressure receiving edge portion is formed in the housing and the pressure applying step is performed, the effects similar to those obtained when the outer race is held by the bearing holder as described above, are brought about.

(d) In the above embodiments, examples are shown in which the special, pressure receiving edge portion for performing the pressure applying step is formed in the bearing holder or the housing. However, if a portion through which pressure can be applied to the bearing holder or the housing in the direction of the force holding the outer race already exists, such a portion may be used.

(e) In the above embodiments, the mechanism driven by the actuator is a variable valve mechanism that continuously adjusts the maximum valve lift of the intake valve provided in an internal combustion engine. However, the mechanism driven by the actuator may be a variable valve mechanism that continuously adjusts the maximum valve lift of the exhaust valve provided in an internal combustion engine. Further, the mechanism driven by the actuator is not limited to the variable valve mechanism and may be another mechanism. The application is not limited to the internal combustion engine.

(f) In the above embodiments, the planetary differential screw-based rotation/linear motion converting mechanism is used as the rotation/linear motion converting mechanism. However, the feed screw mechanism may be used.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the scope of the invention.

What is claimed is:

1. A swaging hold method of swaging a held member, comprising:

forming a swaged portion by bending an end portion of a workpiece by swaging to hold the held member along a base portion of the workpiece by a holding force exerted by the swaged portion; and applying a pressing force to the base portion of the workpiece in a direction the same as a direction of the holding force simultaneously when the swaging is performed, wherein the base portion is not subject to be bent by swaging, wherein the base portion of the workpiece includes an edge portion which protrudes on a side of the workpiece opposite to a side toward which the end portion is bent, the edge portion located in a region of the base portion adjacent to the swaged portion, and the pressing force is applied to the edge portion.

2. The swaging hold method according to claim 1, wherein:

the workpiece is cylindrical;

the edge portion is formed on an outer circumference side of the workpiece; and in the swaging, the swaged portion is formed by bending the end portion of the workpiece toward an inner circumference side of the workpiece.

3. A swaging hold method of swaging a held member, comprising:

forming a swaged portion by bending an end portion of a workpiece by swaging to hold the held member along a base portion of the workpiece by a holding force exerted by the swaged portion; and applying a pressing force to the base portion of the workpiece in a direction the same as a direction of the holding force simultaneously when the swaging is performed, wherein the base portion is not subject to be bent by swaging, wherein the held member is a bearing; and the workpiece is one of a housing that houses therein a rotary member rotatably disposed via the bearing and a bearing holder that is disposed in the housing, wherein the bearing, and the one of the housing and the bearing holder are provided for a rotation/linear motion converting actuator configured to drive a driven apparatus, wherein the one of the housing and the bearing holder are attached to the driven apparatus, and the rotation/linear motion converting actuator is such that the rotary member is rotatably disposed via the bearing in the bearing holder or the housing that is attached to the driven apparatus, an output shaft, which is moved in an axial direction of the workpiece by rotation of the rotary member, projects from the housing to the outside, and a driving force is transmitted from the output shaft to the driven apparatus.

4. The swaging hold method according to claim 3, wherein:

the rotary member is a nut of a planetary differential screw-based rotation/linear motion converting mechanism;

the output shaft is a sun shaft; and a planetary shaft is disposed between the nut and the sun shaft, so that rotation/linear motion conversion is performed by a mechanism formed in the nut by meshing the sun shaft, the planetary shaft, and the nut.

5. The swaging hold method according to claim 3, wherein the driven apparatus is an internal combustion engine.

* * * * *